US011260696B2

(12) United States Patent
Yasunaga et al.

(10) Patent No.: US 11,260,696 B2
(45) Date of Patent: Mar. 1, 2022

(54) PNEUMATIC TIRE

(71) Applicant: TOYO TIRE & RUBBER CO., LTD., Itami (JP)

(72) Inventors: Toshikazu Yasunaga, Itami (JP); Jiro Taniguchi, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 618 days.

(21) Appl. No.: 16/101,993

(22) Filed: Aug. 13, 2018

(65) Prior Publication Data
US 2019/0061429 A1 Feb. 28, 2019

(30) Foreign Application Priority Data
Aug. 31, 2017 (JP) .............................. JP2017-167117

(51) Int. Cl.
B60C 13/02 (2006.01)
B60C 11/01 (2006.01)
(Continued)

(52) U.S. Cl.
CPC .......... B60C 11/01 (2013.01); B60C 11/0306 (2013.01); B60C 11/1204 (2013.01); B60C 11/1263 (2013.01); B60C 11/13 (2013.01); B60C 11/1307 (2013.01); B60C 2011/0344 (2013.01); B60C 2011/0346 (2013.01); B60C 2011/0358 (2013.01); B60C 2011/0386 (2013.01); B60C 2011/1209 (2013.01);
(Continued)

(58) Field of Classification Search
CPC .............. B60C 11/01; B60C 2011/013; B60C 2011/016; B60C 13/00; B60C 13/02; B60C 13/002; B60C 13/023; B60C 2013/026
See application file for complete search history.

(56) References Cited

U.S. PATENT DOCUMENTS

2008/0271826 A1   11/2008   Maxwell et al.
2010/0038001 A1   2/2010    Yamaguchi
(Continued)

FOREIGN PATENT DOCUMENTS

CN   101298229 A    11/2008
CN   202053836 U    11/2011
(Continued)

OTHER PUBLICATIONS

Office Action dated Nov. 19, 2020, issued in counterpart CN Application No. 201810926777.9, with English translation (14 pages).
(Continued)

Primary Examiner — Cedrick S Williams
(74) Attorney, Agent, or Firm — Westerman, Hattori, Daniels & Adrian, LLP

(57) ABSTRACT

A pneumatic tire includes: a plurality of shoulder blocks that are provided in a side portion, defined by a shoulder main groove extending in a tire circumferential direction and a shoulder lateral groove extending in a tire width direction, and disposed side by side in the tire circumferential direction; a rib that is provided in the side portion, and extends in the tire circumferential direction along the shoulder blocks; and a projection that is provided in the side portion, and extends from the rib toward the shoulder blocks.

4 Claims, 4 Drawing Sheets

(51) Int. Cl.
  *B60C 11/12* (2006.01)
  *B60C 11/13* (2006.01)
  *B60C 11/03* (2006.01)
(52) U.S. Cl.
  CPC ............... *B60C 2011/1213* (2013.01); *B60C 2011/1227* (2013.01); *B60C 2011/1254* (2013.01)

(56) References Cited

U.S. PATENT DOCUMENTS

| 2010/0200135 A1 | 8/2010 | Ohara |
| 2010/0288409 A1 | 11/2010 | Ohara |
| 2017/0166013 A1 | 6/2017 | Kuwano |
| 2019/0039420 A1 | 2/2019 | Akashi |

FOREIGN PATENT DOCUMENTS

| CN | 107031296 A | | 8/2017 | |
| EP | 2979901 A1 | | 2/2016 | |
| JP | H11-291718 A | | 10/1999 | |
| JP | 2004291937 A | * | 10/2004 | ............. B60C 13/02 |
| JP | 2007-203970 A | | 8/2007 | |
| JP | 2010-179819 A | | 8/2010 | |
| JP | 2010-264962 A | | 11/2010 | |
| JP | 5374362 B2 | | 12/2013 | |
| JP | 2017-109543 A | | 6/2017 | |
| JP | 2017-140926 A | | 8/2017 | |

OTHER PUBLICATIONS

Office Action dated Apr. 3, 2020, issued in counterpart CN Application No. 201810926777.9, with English Translation. (14 Pages).
Office Action dated Jul. 2, 2020, issued in counterpart DE Application No. 102018119917.1, with English Translation. (13 pages).
Office Action dated Apr. 6, 2021, issued in counterpart JP Application No. 2017-167117, with English Translation. (8 pages).
Office Action dated Jun. 29, 2021, issued in counterpart JP application No. 2017-167117, with English machine translation. (6 pages).

* cited by examiner

PNEUMATIC TIRE

CROSS-REFERENCE TO RELATED APPLICATIONS

This application claims priority of Japanese Patent Application No. 2017-167117 filed on Aug. 31, 2017, the content of which is incorporated herein by reference.

TECHNICAL FIELD

The present invention relates to a pneumatic tire.

BACKGROUND ART

A pneumatic tire which is conventionally known includes turbulent flow generating projections extending on a tire surface from an inner circumferential side toward an outer circumferential side, and spaced from each other in a tire circumferential direction (see Japanese Patent No. 5374362).

This conventional pneumatic tire only includes the turbulent flow generating projections in a side portion to achieve cooling performance. Reduction of vertical deflection of the tire has not been described.

SUMMARY OF INVENTION

An object of the present invention is to provide a pneumatic tire capable of improving rigidity of shoulder blocks and an auxiliary rib, and thereby reducing vertical deflection of a side portion while achieving external damage resistance, cooling performance, and traction performance.

A pneumatic tire according to one aspect of the present invention includes: a plurality of shoulder blocks that are provided in a side portion, defined by a shoulder main groove extending in a tire circumferential direction and a shoulder lateral groove extending in a tire width direction, and disposed side by side in the tire circumferential direction; an auxiliary rib that is provided in the side portion, and extends in the tire circumferential direction along the plurality of shoulder blocks; and a projection that is provided in the side portion, and extends from the auxiliary rib toward the plurality of shoulder blocks.

This configuration enhances external damage resistance, cooling performance, and traction performance of the projections, and also increases rigidity by reinforcing the shoulder blocks and the auxiliary rib. Accordingly, comfortable ride is achievable by reduction of vertical deflection of the side portion.

The projection preferably extends toward the plurality of shoulder blocks with an inclination.

This configuration secures a sufficient length of the projection in the tire circumferential direction, thereby further enhancing external damage resistance.

The projection preferably includes two ridges that extend in an identical direction.

This configuration further increases rigidity of the shoulder blocks.

A center line of each of the plurality of shoulder blocks is preferably inclined to a line extending in the tire width direction. A center line of the projection is preferably inclined to the line extending in the tire width direction. An inclination direction of the center line of each of the plurality of shoulder blocks to the tire width direction is preferably opposite to an inclination direction of the center line of the projection to the tire width direction.

This configuration allows a reinforcing direction of the shoulder blocks to become more appropriate.

Each of the shoulder blocks preferably includes a serrated notch portion in which a distal end portion of each of the ridges of the projection is located.

This configuration improves effects of the projection on the shoulder blocks, thereby further increasing rigidity.

According to the present invention, a projection is provided from an auxiliary rib toward shoulder blocks. Accordingly, vertical deflection of a side portion decreases with increase in rigidity of the shoulder blocks and the auxiliary rib, while achieving external damage resistance, cooling performance, and traction performance.

BRIEF DESCRIPTION OF THE DRAWINGS

The foregoing and the other feature of the present invention will become apparent from the following description and drawings of an illustrative embodiment of the invention in which.

DETAILED DESCRIPTION OF EMBODIMENTS

Embodiments according to the present invention are hereinafter described with reference to the accompanying drawings. It should be noted that the following description is essentially presented by way of example, and not intended to limit the present invention, applicable ranges of the present invention, or purposes of use of the present invention. In addition, the accompanying drawings are only schematic figures, and do not show actual ratios or the like of respective dimensions.

First Embodiment

Figure 1:
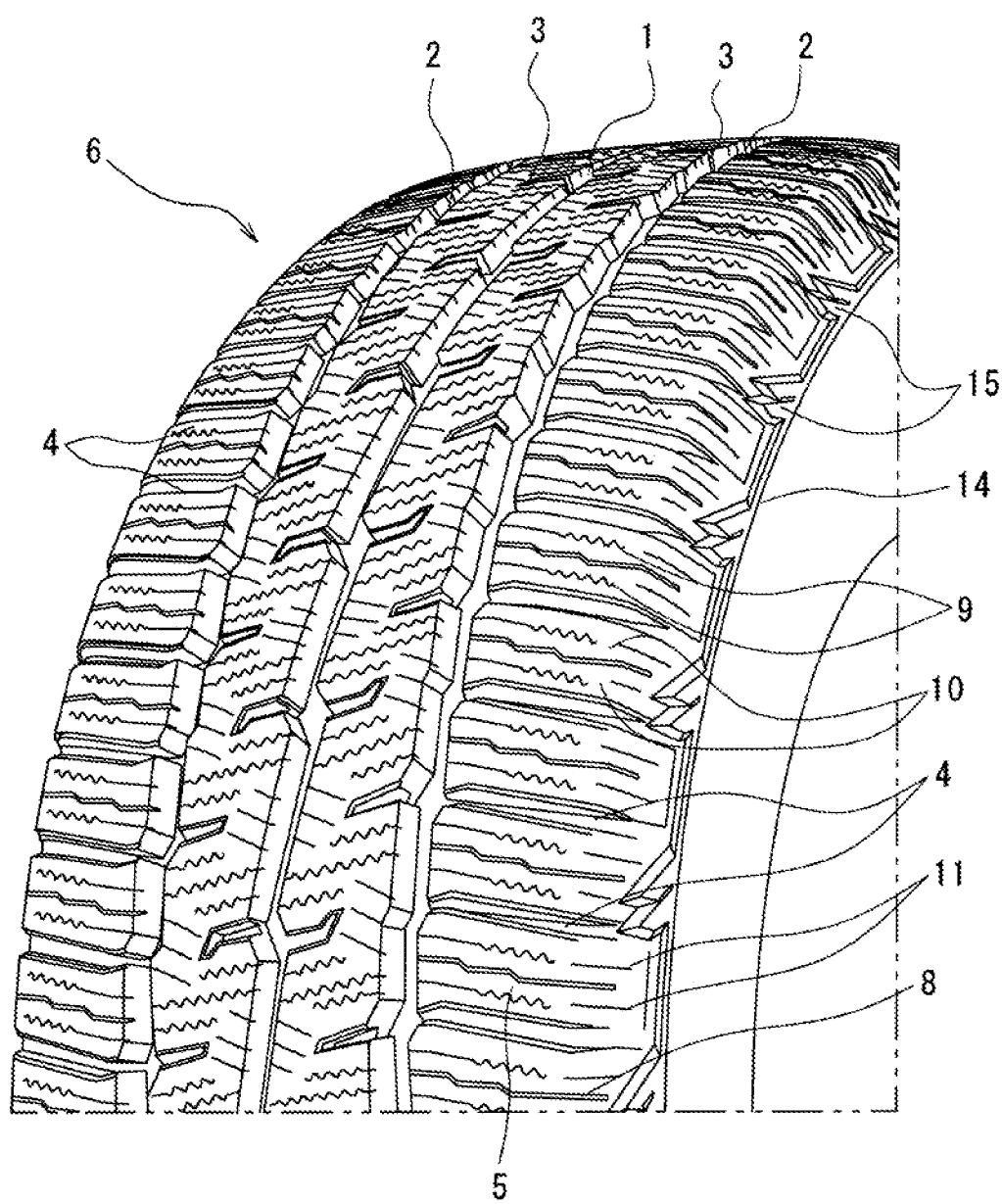
FIG. 1 is a partial perspective view illustrating a tread pattern of a pneumatic tire according to a first embodiment.

FIG. 1 is a perspective view of a pneumatic tire according to a first embodiment. This pneumatic tire has a not-shown configuration which includes a carcass extending between a pair of head cores, a belt wound around an outer circumference of an intermediate portion of the carcass for reinforcement, and a tread portion 6 disposed on a tire outside diameter side of the belt.

Figure 2:
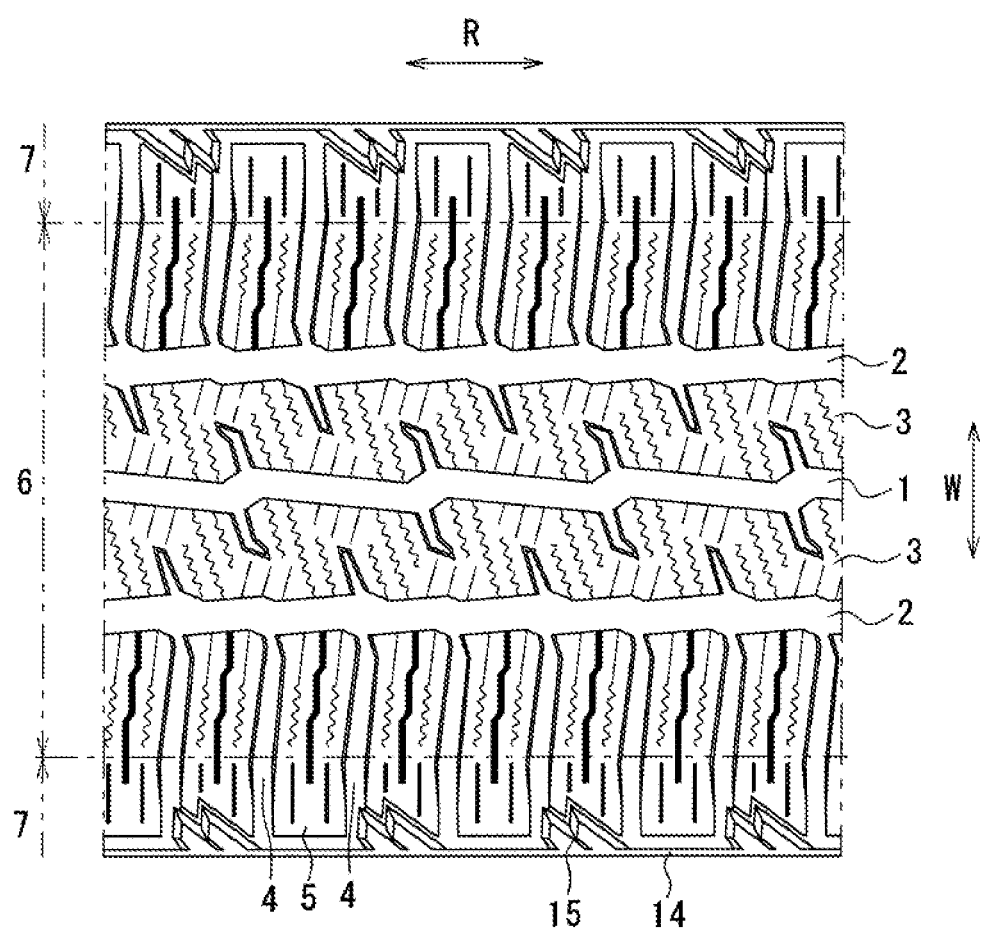
FIG. 2 is a partial developed view of a tread portion of the pneumatic tire according to the first embodiment.

FIG. 2 is a partial developed view illustrating a tread pattern of the pneumatic tire shown in FIG. 1. This tread pattern includes a center main groove 1 which is disposed substantially at a center in a tire width direction (indicated by arrow W in FIG. 2), and extends in a tire circumferential direction (indicated by arrow R in FIG. 2). The center main groove 1 is a groove extending in a zigzag shape in the tire circumferential direction, and having a depth of about 10.2 mm, for example. Shoulder main grooves 2 are respectively formed on one and the other sides of the center main groove 1. Similarly to the center main groove 1, each of the shoulder main grooves 2 is a groove extending in a zigzag shape in the tire circumferential direction, and having a depth of about 10.2 mm, for example. Two center ribs 3 extending in the tire circumferential direction are formed by the center main groove 1 and the shoulder main grooves 2.

Shoulder lateral grooves 4 extending substantially in the tire width direction communicate with the shoulder main grooves 2. Each of the shoulder lateral grooves 4 is a groove extending from the shoulder main groove 2 to a tire peripheral portion, and having a depth of about 9.6 mm, for example. A plurality of shoulder blocks 5 are formed by the shoulder main grooves 2 and the shoulder lateral grooves 4, and disposed in the tire circumferential direction. The center ribs 3 and a part of the shoulder blocks 5 constitute a tread portion 6 coming into contact with road surfaces during running. According to the present embodiment, regions on both sides of the tread portion 6 are defined as side portions 7.

Figure 3:
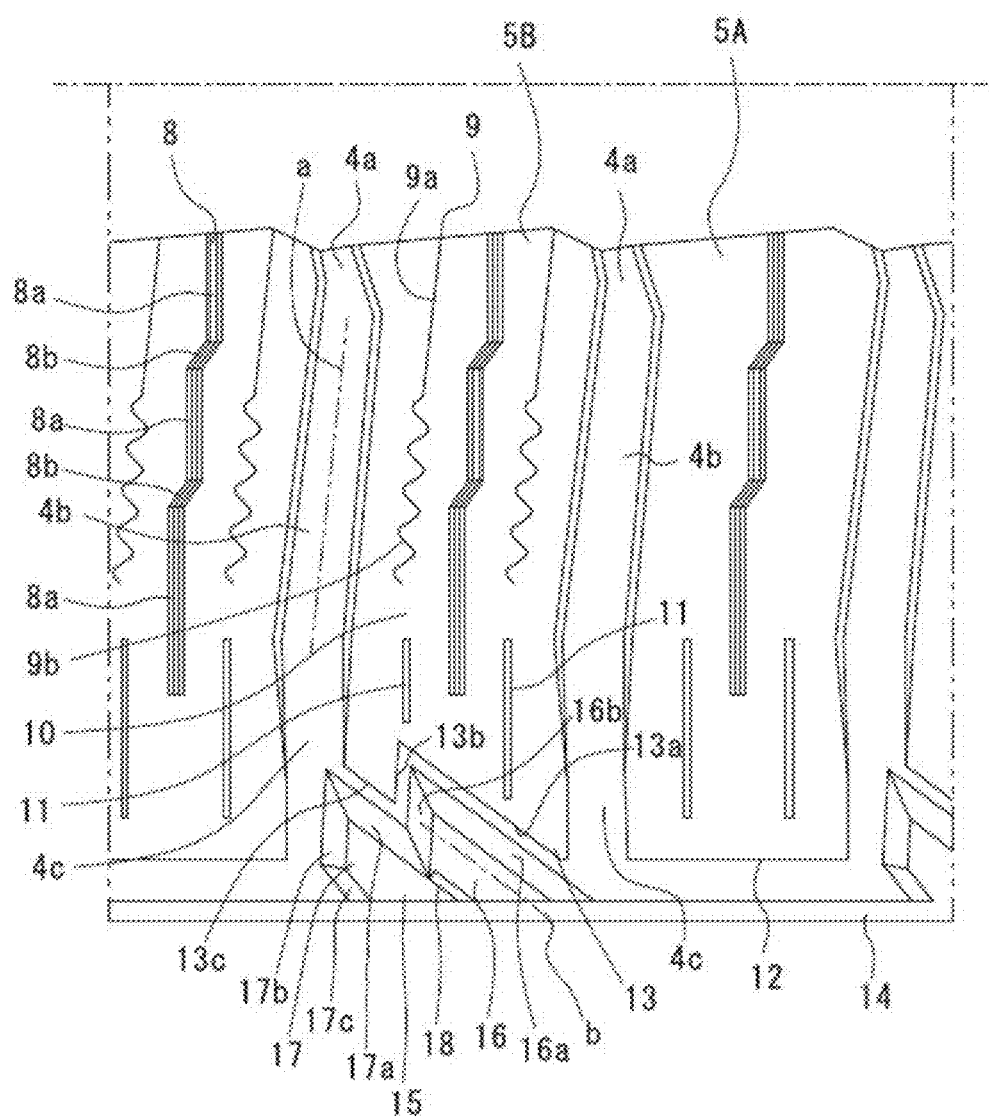
FIG. 3 is a partial enlarged view of a shoulder region in FIG. 2.

As illustrated in FIG. 3, each of the shoulder lateral grooves 4 includes an expanded portion 4a constituted by side surfaces of the shoulder block 5 and having a width which gradually increases from a communicating portion with the shoulder main groove 2, an inclined portion 4b extending with an inclination to the tire width direction and having a uniform width, and a linear portion 4c extending straight and outwardly in the tire width direction. Side surfaces of the shoulder block 5 at the expanded portion 4a, the inclined portion 4b, and a part of the linear portion 4c are constituted by inclined surfaces gradually expanding toward a tire surface. An inclination direction of a center line (indicated by alternate long and short dash line a in FIG. 3) of the inclined portion 4b of the shoulder lateral groove 4 to the tire width direction on one side in the tire width direction is opposite to an inclination direction of the corresponding center line on the other side.

Each of the shoulder blocks 5 includes a discontinuous sipe 8 disposed substantially at a center of the shoulder block 5 in the tire circumferential direction, and extending in the tire width direction from the shoulder main groove 2. The discontinuous sipe 8 is a sipe produced by connecting three linear portions 8a via two bridge portions 8b shallower than the linear portions 8a. The linear portions 8a are disposed at positions shifted from each other in the tire circumferential direction, and extend straight in the tire width direction. Each of the linear portions 8a is a groove having a depth of about 8.5 mm, for example. Each of the bridge portions 8b is a groove having a depth of about 1 mm, for example. The linear portions 8a positioned at outer positions in the tire width direction have larger lengths.

Each of the shoulder blocks 5 includes two composite sipes 9 respectively formed on one and the other sides of the discontinuous sipe 8, and extending in the tire width direction from the shoulder main groove 2. Each of the composite sipes 9 includes a linear portion 9a extending linearly substantially in the tire width direction from the shoulder main groove 2, and a corrugated portion 9b extending in a corrugated shape substantially in the tire width direction from the linear portion 9a. A plain region 10 is formed at a distal end of the corrugated portion 9b in the tire width direction. Two 2D sipes 11 formed further beyond the plain region 10 in the tire width direction linearly extend in the tire width direction.

The shoulder block 5 includes a first shoulder block 5A constituted by an arc-shaped portion 12 whose outer edge portion in the tire width direction extends in the tire circumferential direction, and a second shoulder block 5B constituted by a deformed portion 13 providing a space for a projection 15 described below. The first shoulder block 5A and the second shoulder block 5B are alternately arranged in the tire circumferential direction. The deformed portion 13 is constituted by a first inclined portion 13a, a second inclined portion 13b, and a third inclined portion 13c. The first inclined portion 13a is disposed on a side surface formed by the shoulder lateral groove 4 on one side of the shoulder block 5, and extends in the tire circumferential direction from an outer end of the side surface in the tire width direction toward an inner side of the side surface in the tire width direction. The second inclined portion 13b continuously extends from the first inclined portion 13a substantially toward the outside in the tire width direction. The third inclined portion 13c continuously extends from the second inclined portion 13b at the same angle as the angle of the first inclined portion 13a, and reaches the shoulder lateral groove 4.

An auxiliary rib 14 connected in an annular shape in the tire circumferential direction is formed in a tire circumferential edge portion. The projections 15 extend from the auxiliary rib 14 toward the respective second shoulder blocks 5B. An inclination direction of a center line (indicated by alternate long and short dash line h in FIG. 3) of each of the projections 15 to the tire width direction is opposite to the inclination direction of the center line (indicated by alternate long and short dash line a in FIG. 3) of the inclined portion 4b of each of the shoulder lateral grooves 4 to the tire width direction. Each of the projections 15 includes a first ridge 16 and a second ridge 17 disposed side by side with distal end positions of the first ridge 16 and the second ridge 17 shifted from each other.

The first ridge 15 has the same height from the surface of the side portion 7 as the height of the auxiliary rib 14, and includes a first inclined surface 16a and a second inclined surface 16b. The first inclined surface 16a and the second inclined surface 16b join each other to constitute a tapered distal end portion having a triangular shape. The second ridge 17 also includes a first inclined surface 17a and a second inclined surface 17b each extending to the same height as the height of the auxiliary rib 14, and constitute a distal end portion similar to the distal end portion of the first ridge 16. The second ridge 17 further includes a third inclined surface 17c on the side opposite to the first inclined surface 17a. A slit 18 is formed at a boundary between the first ridge 16 and the second ridge 17. The first ridge 16 and the second ridge 17 are therefore independently and elastically deformable. The first inclined surface 16a of the first ridge 16 is located with a predetermined clearance left from the first inclined portion 13a of the shoulder block 5. Similarly, the second inclined surface 16b of the first ridge 16 is located with a predetermined clearance left from the second inclined portion 13b of the shoulder block 5. The first inclined surface 17a of the second ridge 17 is positioned with a predetermined clearance left from the third inclined portion 13c of the shoulder block 5.

The pneumatic tire having the above configuration includes the projections 15 extending from the auxiliary rib 14 toward the shoulder blocks 5. Accordingly, the following advantages are obtained.

(1) The projections 15 each reinforce the shoulder block 5 and the auxiliary rib 14 and increase rigidity, thereby reducing vertical deflection of the side portion 7.

(2) In particular, each of the projections 15 formed by the two ridges 16 and 17 is so shaped as to invade the shoulder block 5. Accordingly, vertical deflection of the side portion 7 further decreases.

(3) The inclined shape of each of the projections 15 increases a space occupied by the projection 15 in the tire circumferential direction. Accordingly, external damage resistance increases.

(4) Each of the projections 15 does not greatly project into the shoulder lateral groove 4. Accordingly, drainage by the shoulder lateral grooves 4 does not deteriorate.

Second Embodiment

Figure 4:
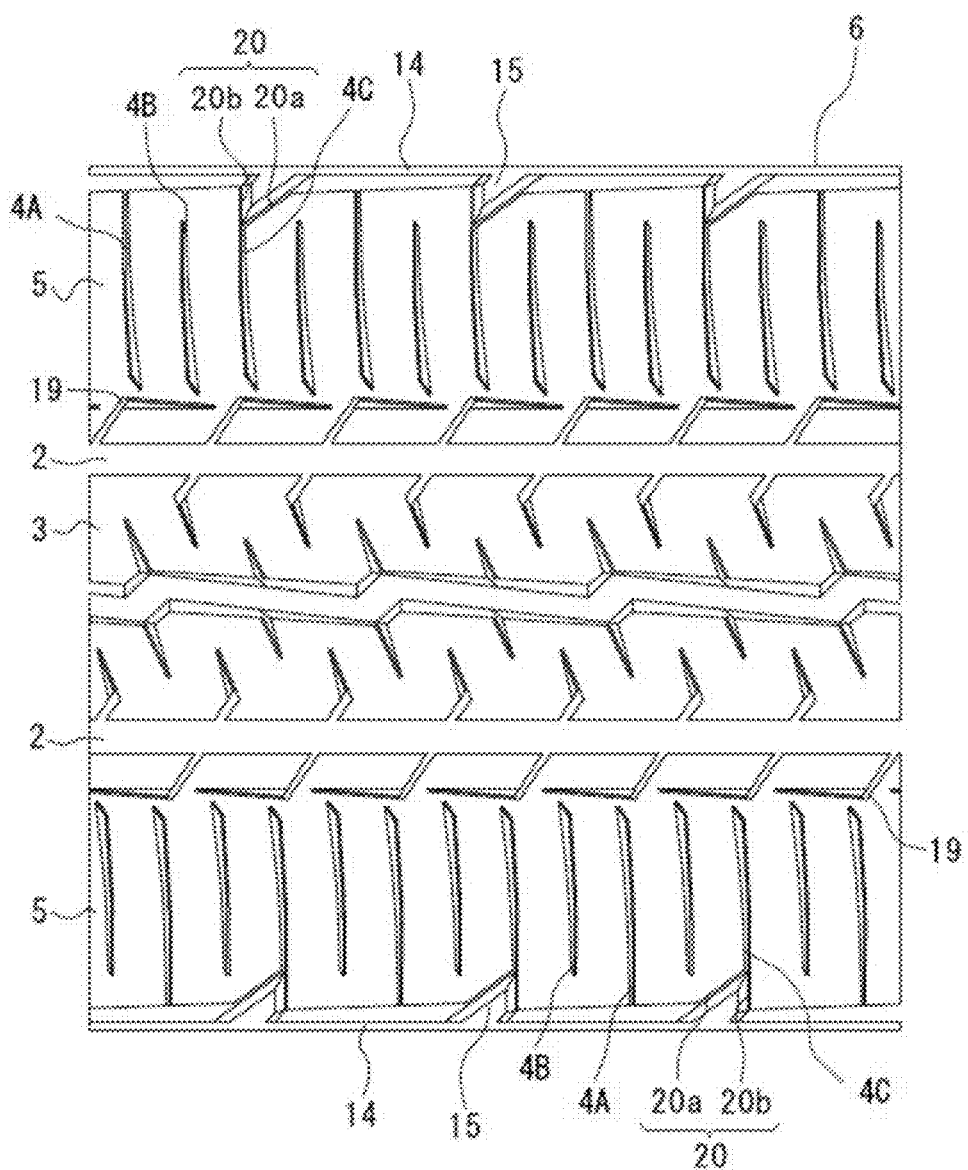
FIG. 4 is a partial developed view of a tread portion of a pneumatic tire according to a second embodiment.

FIG. 4 is a developed view of the tread portion 6 of a pneumatic tire according to a second embodiment. The configuration of the center rib 3 is substantially the same as the corresponding configuration of the first embodiment. The shoulder blocks 5 are not completely separated from each other in the tire circumferential direction, but are partially connected with each other. Each of the shoulder blocks 5 includes a notch 19 extending outwardly in the tire width direction from the shoulder main groove 2, and bent at a substantially right angle at an intermediate position of the notch 19. Each of the shoulder blocks 5 further includes notch portions 20 at predetermined intervals in the tire circumferential direction at an end of the shoulder block 5 opposite to the shoulder main groove 2. Each of the notch portions 20 has a triangular shape formed by a first inclined portion 20*a* and a second inclined portion 20*b*.

Each of the shoulder blocks 5 further includes a plurality of the shoulder lateral grooves 4 extending outwardly in the tire width direction from the vicinity of the notch 19. Each of the shoulder lateral grooves 4 is constituted by a first shoulder lateral groove 4A reaching an shoulder end, a second shoulder lateral groove 4B terminated before the shoulder end, and a third shoulder lateral groove 4C communicating with the notch portion 20.

Each of the projections 15 extending from the auxiliary rib 14 is constituted by a single ridge having the same configuration as the configuration of the second ridge 17. A distal end of each of the projections 15 is positioned within the notch portion 20 of the shoulder block 5, forming a narrow groove between the projection 15 and the first and second inclined portions 20*a* and 20*b*.

Similarly to the first embodiment, each of the projections 15 having the foregoing configuration increases rigidity of the shoulder block 5 and the auxiliary rib 14, and reduces vertical deflection of the tire.

The invention claimed is:

1. A pneumatic tire comprising:
a plurality of shoulder blocks that are provided in a side portion, defined by a shoulder main groove extending in a tire circumferential direction and a shoulder lateral groove extending in a tire width direction, and disposed side by side in the tire circumferential direction;
an auxiliary rib that is provided in the side portion, and extends in the tire circumferential direction along the plurality of shoulder blocks; and
a projection comprising a plurality of ridges, wherein each ridge of the plurality of ridges is provided with a tapered distal end portion having a triangular shape from the auxiliary rib toward the plurality of shoulder blocks, wherein
the projection extends toward the plurality of shoulder blocks with an inclination, and
each of the plurality of shoulder blocks includes a serrated notch portion in which the tapered distal end portion of each of the plurality of ridges of the projection is located.

2. The pneumatic tire according to claim 1, wherein
a center line of each of the plurality of shoulder blocks is inclined to a line extending in the tire width direction,
a center line of the projection is inclined to the line extending in the tire width direction,
and
an inclination direction of the center line of each of the plurality of shoulder blocks to the tire width direction is opposite to an inclination direction of the projection to the tire width direction.

3. The pneumatic tire according to claim 1, wherein the projection comprising a plurality of ridges, includes two ridges that extend in an identical direction.

4. The pneumatic tire according to claim 3, wherein
a center line of each of the plurality of shoulder block is inclined to a line extending in the tire width direction,
a center line of the projection is inclined to the line extending in the tire width direction,
and
an inclination direction of the center line of each of the plurality of shoulder blocks to the tire width direction is opposite to an inclination direction of the center line of the projection to the tire width direction.

\* \* \* \* \*